(12) United States Patent
Aizawa

(10) Patent No.: US 11,323,688 B2
(45) Date of Patent: May 3, 2022

(54) INFORMATION PROCESSING APPARATUS AND INFORMATION PROCESSING METHOD FOR GENERATING A VIRTUAL VIEWPOINT

(71) Applicant: CANON KABUSHIKI KAISHA, Tokyo (JP)

(72) Inventor: Michio Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 16/511,582

(22) Filed: Jul. 15, 2019

(65) Prior Publication Data
US 2020/0029065 A1 Jan. 23, 2020

(30) Foreign Application Priority Data
Jul. 20, 2018 (JP) .............................. JP2018-136900

(51) Int. Cl.
*H04N 13/279* (2018.01)
*H04N 13/282* (2018.01)
*G06F 3/02* (2006.01)

(52) U.S. Cl.
CPC ......... *H04N 13/279* (2018.05); *G06F 3/0205* (2013.01); *H04N 13/282* (2018.05)

(58) Field of Classification Search
CPC .. H04N 13/117; H04N 13/279; H04N 13/282; H04N 13/111; H04N 13/239; H04N 13/243; H04N 21/21805; H04N 5/23267; H04N 5/247; H04N 21/4347; H04N 5/232941; H04N 9/045; G06F 3/0205; G06T 15/205
See application file for complete search history.

(56) References Cited

U.S. PATENT DOCUMENTS

| | | | | |
|---|---|---|---|---|
| 10,569,172 | B2* | 2/2020 | Yee | A63F 13/30 |
| 10,917,621 | B2* | 2/2021 | Iwakiri | H04N 13/243 |
| 2018/0160049 | A1* | 6/2018 | Aizawa | H04N 5/247 |
| 2018/0352215 | A1* | 12/2018 | Iwakiri | H04N 13/296 |
| 2019/0083885 | A1* | 3/2019 | Yee | H04N 21/41407 |
| 2020/0234495 | A1* | 7/2020 | Nakao | H04N 21/6587 |

FOREIGN PATENT DOCUMENTS

JP 2015-197832 A 11/2015

* cited by examiner

*Primary Examiner* — Jessica M Prince
(74) *Attorney, Agent, or Firm* — Canon U.S.A., Inc. IP Division

(57) ABSTRACT

An information processing apparatus is configured to perform at least based on a first parameter set according to an operation on a first operation unit, and also based on an operation on a second operation unit, changing at least either of a position and a direction of a virtual viewpoint corresponding to a virtual viewpoint image, receiving a switching input for switching a parameter set according to an operation on the first operation unit from the first parameter to a second parameter, and based on the second parameter set according to an operation on the first operation unit performed after the switching input is received, and also based on an operation on the second operation unit, changing at least either of the position and the direction of the virtual viewpoint.

17 Claims, 11 Drawing Sheets

FIG.7
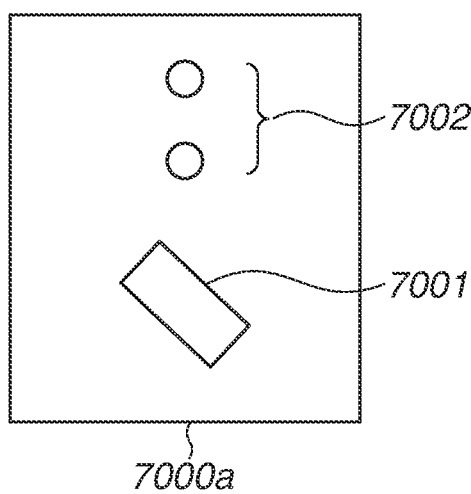
7000a
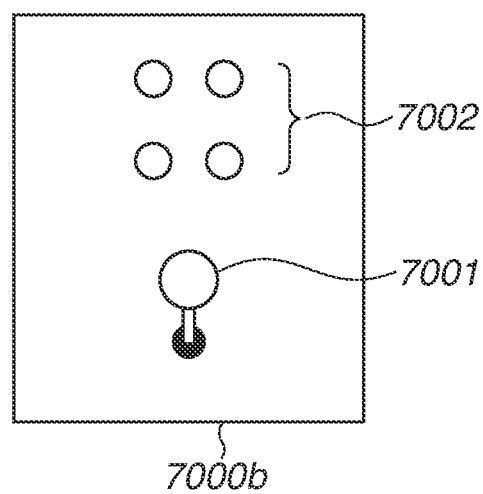
7000b
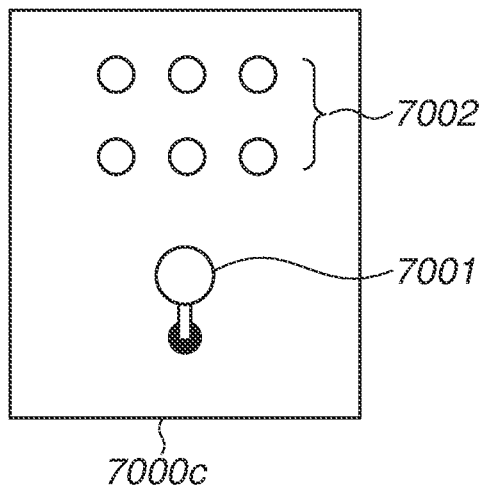
7000c
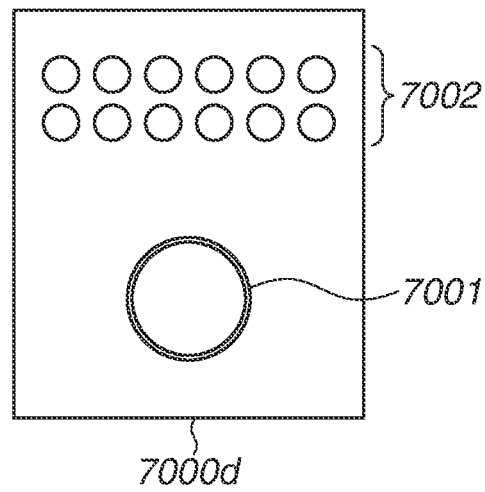
7000d

FIG.8

```
con1 = 3AXIS_CONTROLLER
con2 = 3AXIS_CONTROLLER                       } 8001 x = con1.joystick_left_right
Y = con1.joystick_forward_backward
Z = con1.joystick_twist PAN = con2.joystick_twist                     } 8002
TILT = con2.joystick_forward_backward
ROLL = con2.joystick_left_right X_CURVE = expo
V_CURVE = expo
Z_CURVE = expo
PAN_CURVE = hermite                           } 8003
TILT_CURVE = hermite
ROLL_CURVE = hermite
```

FIG.9

| CONTROL FUNCTION | | ASSIGNMENT | |
|---|---|---|---|
| | | THREE-AXIS CONTROLLER (1) | THREE-AXIS CONTROLLER (2) |
| FIRST MEMBER 7001 | LEFT-RIGHT | X | ROLL |
| | FRONT-BACK | Y | TILT |
| | TWIST | Z | PAN |
| ADJUSTMENT FUNCTION | SECOND MEMBER 7002 (UPPER LEFT) | CURVE PARAMETER OF EXPONENTIAL CURVE FOR X | CURVE PARAMETER OF HERMIT CURVE FOR PAN |
| | SECOND MEMBER 7002 (LOWER LEFT) | CURVE PARAMETER OF EXPONENTIAL CURVE FOR Y | CURVE PARAMETER OF HERMIT CURVE FOR TILT |
| | SECOND MEMBER 7002 (UPPER MIDDLE) | CURVE PARAMETER OF EXPONENTIAL CURVE FOR Z | CURVE PARAMETER OF HERMIT CURVE FOR ROLL |
| | SECOND MEMBER 7002 (LOWER MIDDLE) | MAXIMUM VELOCITY FOR X | MAXIMUM VELOCITY FOR PAN |
| | SECOND MEMBER 7002 (UPPER RIGHT) | MAXIMUM VELOCITY FOR Y | MAXIMUM VELOCITY FOR TILT |
| | SECOND MEMBER 7002 (LOWER RIGHT) | MAXIMUM VELOCITY FOR Z | MAXIMUM VELOCITY FOR ROLL |

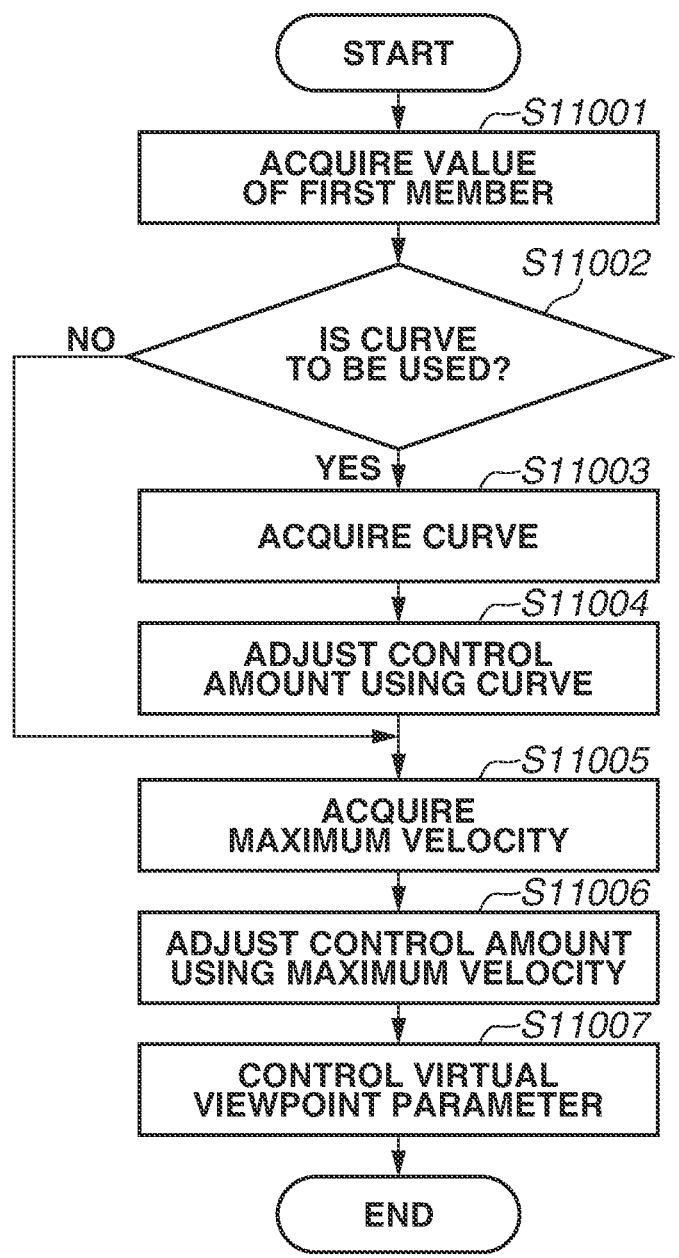

INFORMATION PROCESSING APPARATUS AND INFORMATION PROCESSING METHOD FOR GENERATING A VIRTUAL VIEWPOINT

BACKGROUND

Field of the Disclosure

The present disclosure relates to an information processing apparatus, an information processing method, and a storage medium.

Description of the Related Art

In recent years, attention is drawn to a technique for installing a plurality of imaging apparatuses at different positions and generating a virtual viewpoint image that is an image from any viewpoint, using a plurality of images captured in synchronization with one another from multiple viewpoints via the plurality of imaging apparatuses. The virtual viewpoint image can also be regarded as an image captured by a virtual camera as a virtual imaging apparatus placed at a virtual viewpoint.

In a service using such a virtual viewpoint image, for example, a moving image producer can produce, from a moving image obtained by imaging a soccer match or a rugby match, a content from an impressive viewpoint. Further, a user viewing the content can even watch the match while freely moving the viewpoint himself/herself. Thus, it is possible to give the user a higher realistic sensation than a conventional captured image.

A parameter regarding the generation of an image is controlled through a controller. Japanese Patent Application Laid-Open No. 2015-197832 discusses a controller for controlling the pan angle, the tilt angle, and the zoom rate of a camera using a joystick and a seesaw control lever.

There is a request to control a parameter regarding the generation of a virtual viewpoint image through a controller. However, there are many parameters regarding the generation of a virtual viewpoint image, such as the position (left, right, front, back, upper, and lower positions in a three-dimensional coordinate system) of a virtual camera, camera parameters (the pan angle, the tilt angle, the roll angle, and the zoom) of the virtual camera, and the time of a scene as a drawing target. Further, for example, if a sport match is drawn as a virtual viewpoint image, then to achieve various types of camerawork that give a high realistic sensation according to the flow of the match, a plurality of parameters regarding the generation of the virtual viewpoint image may be adjusted. In such a case, there is a request to enable control of a parameter specified according to a user through a member included in a controller such that the user can more easily adjust the parameters regarding the generation of the virtual viewpoint image.

In Japanese Patent Application Laid-Open No. 2015-197832, fixed parameters (the pan angle, the tilt angle, and the zoom rate) are controlled through members (the joystick and the seesaw control lever) included in the controller. That is, in Japanese Patent Application Laid-Open No. 2015-197832, a parameter specified according to a user cannot be controlled through the members included in the controller. Thus, the convenience of control of a parameter regarding the generation of a virtual viewpoint image cannot be improved.

SUMMARY

According to an aspect of the present disclosure, an information processing apparatus includes one or more hardware processors, and one or more memories which store instructions executable by the one or more hardware processors to cause the information processing apparatus to perform at least based on a first parameter set according to an operation on a first operation unit, and also based on an operation on a second operation unit, changing at least either of a position and a direction of a virtual viewpoint corresponding to a virtual viewpoint image, receiving a switching input for switching a parameter set according to an operation on the first operation unit from the first parameter to a second parameter, and based on the second parameter set according to an operation on the first operation unit performed after the switching input is received, and also based on an operation on the second operation unit, changing at least either of the position and the direction of the virtual viewpoint.

Further features of the present disclosure will become apparent from the following description of exemplary embodiments with reference to the attached drawings.

BRIEF DESCRIPTION OF THE DRAWINGS

FIG. 7 is a diagram illustrating examples of a controller.

FIG. 8 is a diagram illustrating an example of an assignment setting file.

FIG. 9 is a diagram illustrating an example of assignment of functions to controllers.

FIG. 11 is a flowchart illustrating an example of a process for controlling virtual viewpoint parameters.

DESCRIPTION OF THE EMBODIMENTS

Examples of exemplary embodiments of the present disclosure will be described in detail below based on the drawings.

Figure 1A:
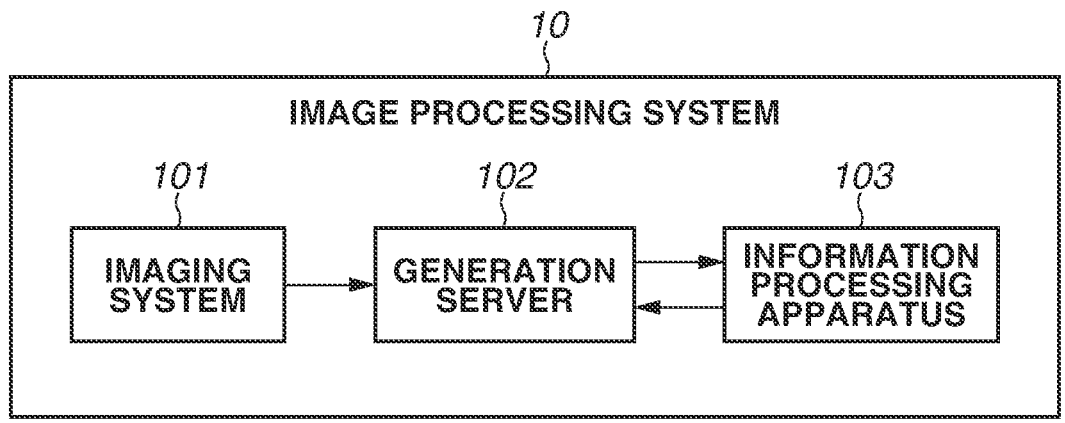
FIGS. 1A and 1B are diagrams illustrating examples of a system configuration of an image processing system.

A first exemplary embodiment is described. FIG. 1A is a diagram illustrating an example of the system configuration of an image processing system 10.

The image processing system 10 includes an imaging system 101, a generation server 102, and an information processing apparatus 103. The image processing system 10 is a system that generates a virtual viewpoint image.

The imaging system 101 includes a plurality of imaging apparatuses placed at positions different from each other and transmits to the generation server 102 a plurality of images captured in synchronization with one another from multiple viewpoints via the plurality of imaging apparatuses. When transmitting a plurality of moving images to the generation server 102, for example, the imaging system 101 periodically transmits to the generation server 102 a plurality of frames (still images) of which the times are synchronized with one another in the plurality of moving images.

Based on a plurality of images captured in synchronization with one another from the multiple viewpoints, the generation server 102 generates a virtual viewpoint image captured by a virtual camera (viewed from a specified virtual viewpoint). The virtual camera is a virtual imaging apparatus capable of freely moving in an image capturing space (however, there may be a certain limitation on the moving range of the virtual camera). The virtual viewpoint image can be regarded as an image captured by the virtual camera. The virtual camera can capture an image viewed from a viewpoint different from any of those of the imaging apparatuses included in the imaging system 101, i.e., a virtual viewpoint image. The viewpoint of the virtual camera is represented by parameters (virtual viewpoint parameters) determined by the information processing apparatus 103. Based on a plurality of images received from the imaging system 101, the generation server 102 sequentially generates a virtual viewpoint image. That is, in a case where live images are transmitted from the imaging system 101, the generation server 102 can generate a live virtual viewpoint image. The live virtual viewpoint image generated by the image processing system 10 is a virtual viewpoint image generated based on images captured by the imaging system 101 at a time taking into account delay in processing in the imaging system 101 and the generation server 102 relative to the current time.

Further, the generation server 102 has the function of recording a plurality of images received from the imaging system 101 in a database stored in a storage device. The generation server 102 can generate a virtual viewpoint image (hereinafter, a "replay virtual viewpoint image") obtained by drawing a scene at a time in the past from the plurality of recorded images. That is, the replay virtual viewpoint image is a virtual viewpoint image in which a scene at any time is generated based on captured images obtained by the imaging system 101.

The information processing apparatus 103 is an information processing apparatus, such as a personal computer (PC), a server apparatus, a tablet apparatus, or a computer built into a device, that determines parameters regarding the generation of a virtual viewpoint image, such as camera parameters of the virtual camera. Hereinafter, the parameters regarding the generation of a virtual viewpoint image will be referred to as "virtual viewpoint parameters". The virtual viewpoint parameters include, for example, camera parameters indicating the position, the orientation (the direction), and the angle of view of the virtual camera, and the time of a scene as a drawing target of a virtual viewpoint image. The virtual viewpoint parameters include, for example, the coordinates of the virtual camera in a coordinate system determined in advance, the angles indicating the pan, tilt, and roll directions of the virtual camera, and the zoom rate of the virtual camera.

The parameters indicating the position of the virtual camera included in the virtual viewpoint parameters may be coordinate values in a three-dimensional coordinate system (e.g., coordinates in an orthogonal coordinate system including three axes, i.e., an X-axis, a Y-axis, and a Z-axis). In this case, the position of the virtual camera specified by the camera parameters of the virtual camera indicates coordinates and is composed of, for example, three parameters, i.e., coordinate values on the X-axis, coordinate values on the Y-axis, and coordinate values on the Z-axis. The origin of the coordinate system may be any position in the image capturing space. Hereinafter, the three virtual viewpoint parameters indicating the coordinates at a virtual viewpoint in the three-dimensional coordinate system determined in advance (the coordinate values on the X-axis, the coordinate values on the Y-axis, and the coordinate values on the Z-axis in the coordinate system) will be referred to as "X-axis coordinate", "Y-axis coordinate", and "Z-axis coordinate".

The orientation of the virtual camera specified by the virtual viewpoint parameters may be represented by the angles to three axes, i.e., pan, tilt, and roll axes. In this case, the orientation of the virtual camera specified by the virtual viewpoint parameters may be composed of three parameters, i.e., the angle in the pan direction, the angle in the tilt direction, and the angle in the roll direction. Hereinafter, the three parameters, i.e., the angle in the pan direction, the angle in the tilt direction, and the angle in the roll direction, indicating the orientation of the virtual camera will be referred to as a "pan angle", a "tilt angle", and a "roll angle".

The angle of view (the zoom rate) of the virtual camera specified by the virtual viewpoint parameters is represented by a single axis regarding the focal length. Further, the time of a scene as a drawing target included in the virtual viewpoint parameters is a parameter on a single axis.

Thus, the virtual viewpoint parameters include at least eight parameters (the pan angle, the tilt angle, the roll angle, the angle of view, the X-axis coordinate, the Y-axis coordinate, the Z-axis coordinate, and the time of a scene). For example, according to operations through controllers connected to the information processing apparatus 103, the information processing apparatus 103 can control these eight parameters. However, not all the eight parameters need to be control targets. Further, a parameter (e.g., the value of the brightness or the contrast of the virtual camera) other than the eight parameters may be a control target.

The information processing apparatus 103 transmits determined virtual viewpoint parameters to the generation server 102. Based on the received virtual viewpoint parameters, the generation server 102 generates a virtual viewpoint image and transmits the generated virtual viewpoint image to the information processing apparatus 103. For example, the information processing apparatus 103 displays the received virtual viewpoint image in a camera view 301 described below with reference to FIG. 2.

In the present exemplary embodiment, a single information processing apparatus 103 generates a live virtual viewpoint image and a replay virtual viewpoint image. Alternatively, two information processing apparatuses 103 may separately generate a live virtual viewpoint image and a replay virtual viewpoint image.

Figure 1B:
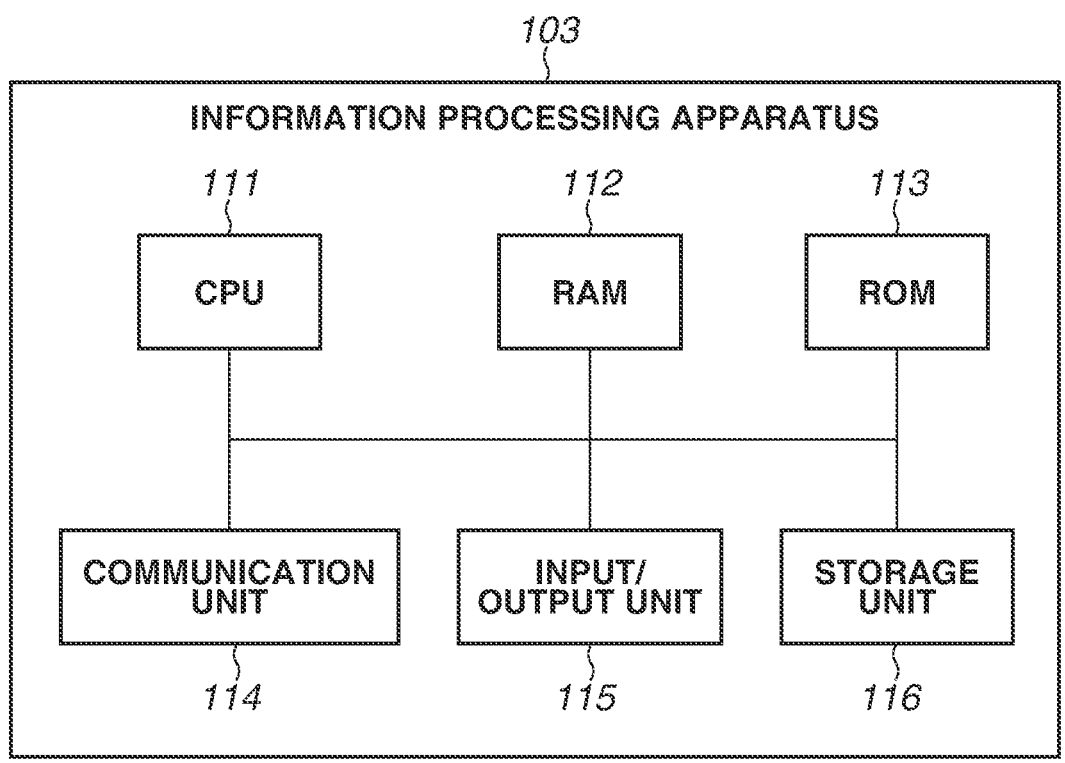

FIG. 1B is a diagram illustrating an example of the hardware configuration of the information processing apparatus 103.

The information processing apparatus 103 includes a central processing unit (CPU) 111, a random-access memory (RAM) 112, a read-only memory (ROM) 113, a communication unit 114, an input/output unit 115, and a storage unit 116. These components are connected to each other via a system bus so that the components can communicate with each other.

The CPU 111 is a central arithmetic unit that controls the entirety of the information processing apparatus 103 using a program and data stored in the RAM 112 or the ROM 113. The RAM 112 is a storage device that functions as a temporary storage area for storing a computer program read from the ROM 113, data of the intermediate results of calculations, and data supplied from outside via the communication unit 114. The ROM 113 is a storage device that stores a computer program and data that do not need to be changed.

The communication unit 114 is an Ethernet interface or a Universal Serial Bus (USB) interface used for communication with an external apparatus such as the generation server 102. The input/output unit 115 is an input/output unit including input devices such as a plurality of controllers for controlling the virtual camera, and output devices such as a plurality of display units for displaying the state of the virtual camera. The storage unit 116 is a storage device, such as a hard disk drive (HDD) or a solid-state drive (SSD), that stores various programs, various pieces of setting information, images captured by the imaging system 101, and a virtual viewpoint image generated by the generation server 102.

Figure 10:
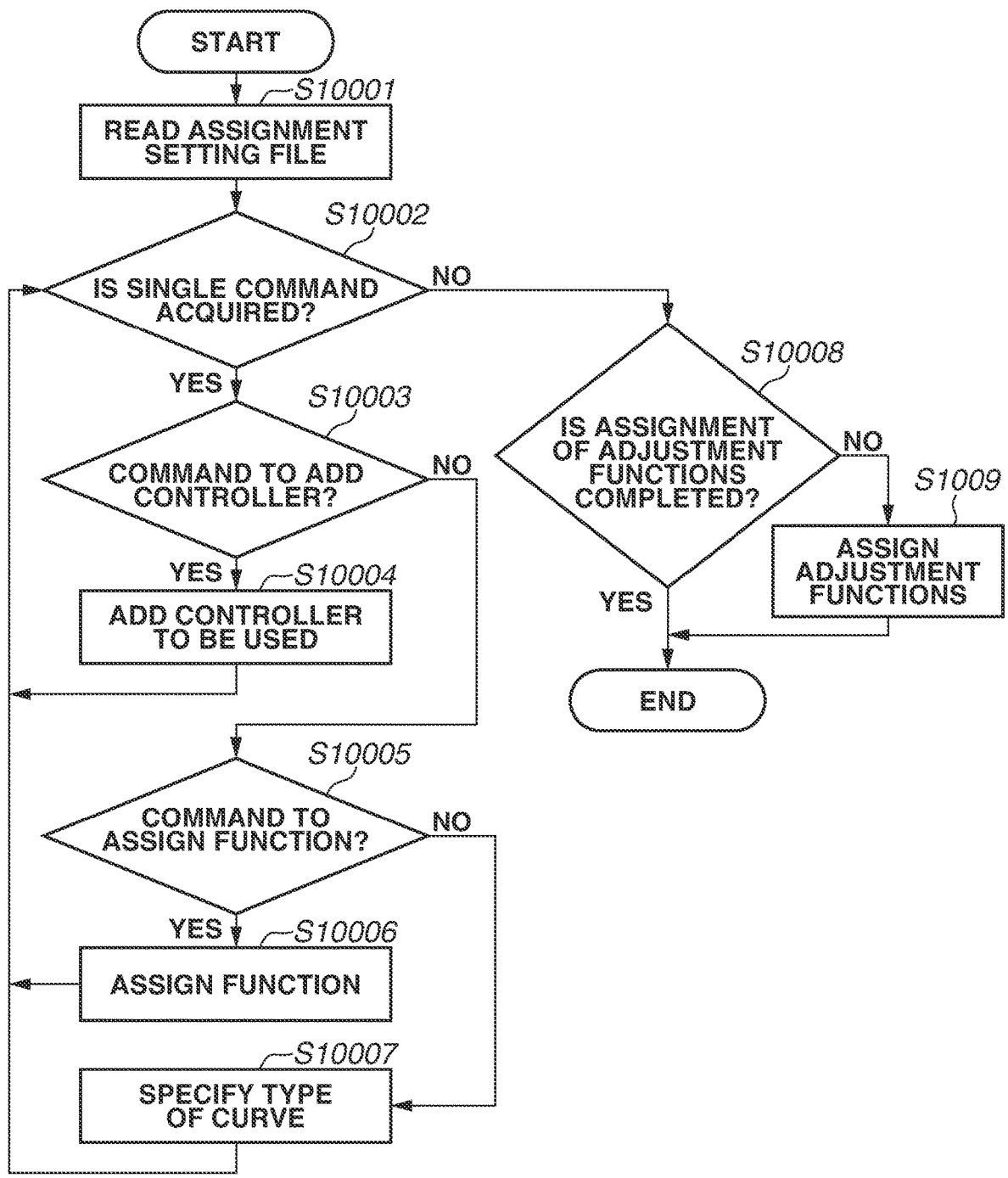
FIG. 10 is a flowchart illustrating an example of an assignment process.

The functions of the information processing apparatus 103 such as functions described below with reference to FIG. 6 and the processing of the information processing apparatus 103 such as processing described below with reference to FIGS. 10 and 11 are achieved by the CPU 111 executing processing according to a program stored in the ROM 113 or the storage unit 116.

Figure 2:
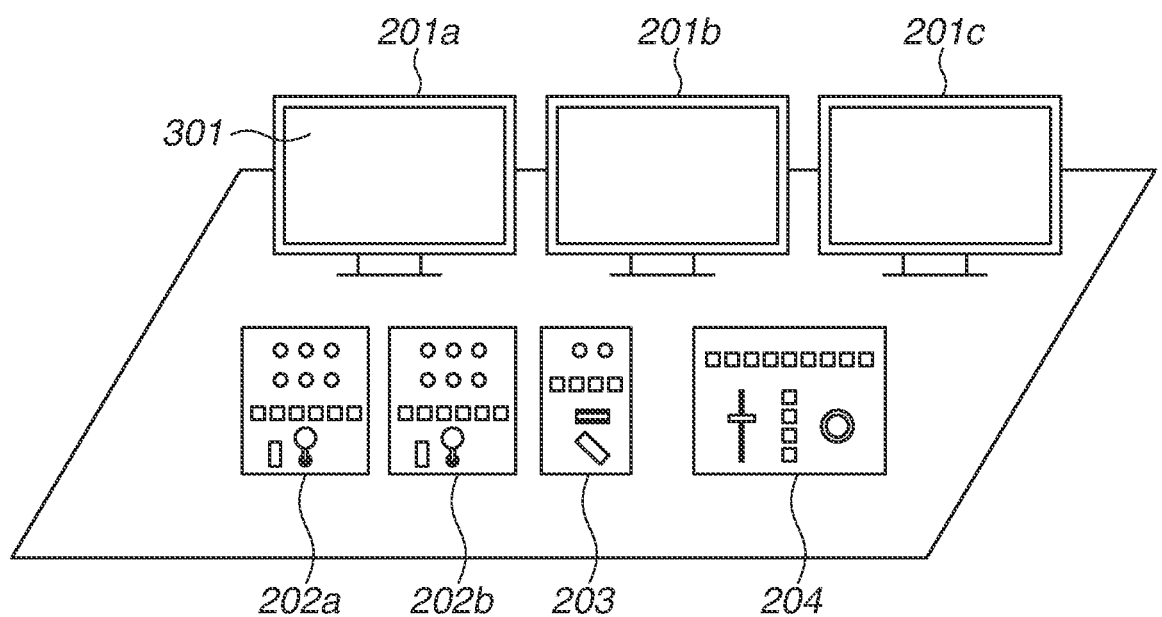
FIG. 2 is a diagram illustrating an example of an input/output unit.

FIG. 2 is a diagram illustrating an example of the input/output unit 115.

In the example of FIG. 2, the input/output unit 115 includes three display units (display units 201a to 201c) as output devices. Each of the display units 201a to 201c is a display device such as a display or a touch panel.

The display unit 201a displays a camera view window. The camera view window is a window including a camera view 301 for displaying a virtual viewpoint image received from the generation server 102.

The display unit 201b displays a pilot window. The pilot window is a window used to control the virtual camera.

The display unit 201c displays a replay window. The replay window is a window used to generate and edit a replay virtual viewpoint image.

Further, the input/output unit 115 includes four controllers (controllers 202a, 202b, 203, and 204). The input/output unit 115 receives an instruction to generate a virtual viewpoint image based on operations of a user through these controllers. That is, the input/output unit 115 receives the operations of changing virtual viewpoint parameters indicating the position and the orientation of the virtual camera.

Each of the controllers 202a and 202b is a three-axis controller that enables operations on three axes. Hereinafter, the controllers 202a and 202b will be collectively referred to as a "controller 202". According to operations on the respective axes through the controller 202, the information processing apparatus 103 can control any parameter.

For example, according to operations on the respective axes through the controller 202a, the information processing apparatus 103 controls the three parameters, i.e., the X-axis coordinate, the Y-axis coordinate, and the Z-axis coordinate, for specifying the position of the virtual camera.

For example, according to operations on the respective axes through the controller 202b, the information processing apparatus 103 controls the three parameters, i.e., the pan angle, the tilt angle, and the roll angle, for specifying the orientation of the virtual camera.

Further, the information processing apparatus 103 can determine which parameter is to be controlled by a process to be performed according to an operation on which axis through the controller 202.

The controller 203 is, for example, a zoom controller as a controller used to control the zoom rate of the virtual camera.

The controller 204 is a replay controller as a controller used to generate a replay virtual viewpoint image. Further, the controller 204 is used to control the parameter indicating the time of a scene as a drawing target of a virtual viewpoint image.

The input/output unit 115 illustrated in FIG. 2 is merely an example. Alternatively, the input/output unit 115 may include one, two, or four or more display units. Yet alternatively, the input/output unit 115 may include three or less, or five or more controllers.

Figure 3:
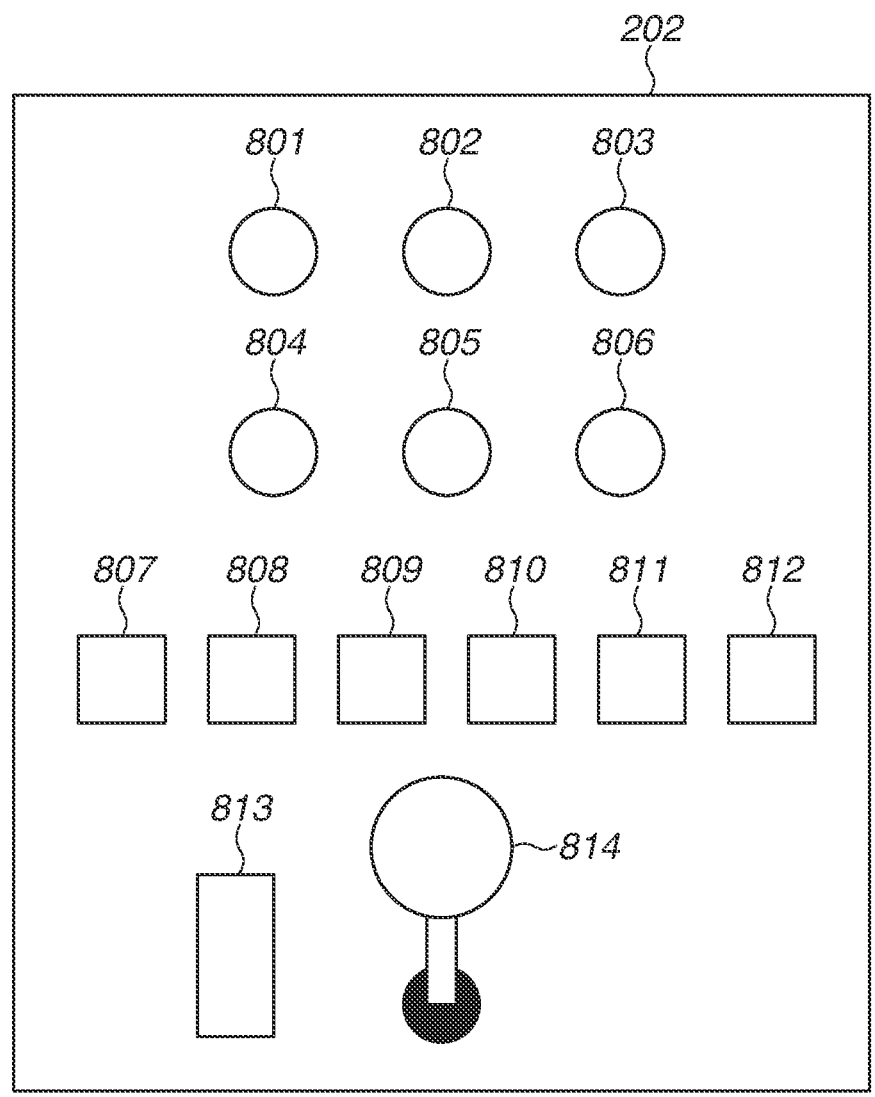
FIG. 3 is a diagram illustrating an example of a three-axis controller.

FIG. 3 is a diagram illustrating an example of the controller 202 as a three-axis controller. In the example of FIG. 3, the controller 202 includes six knobs (801 to 806), six buttons (807 to 812), a seesaw switch 813, and a three-axis joystick 814.

Figure 4:
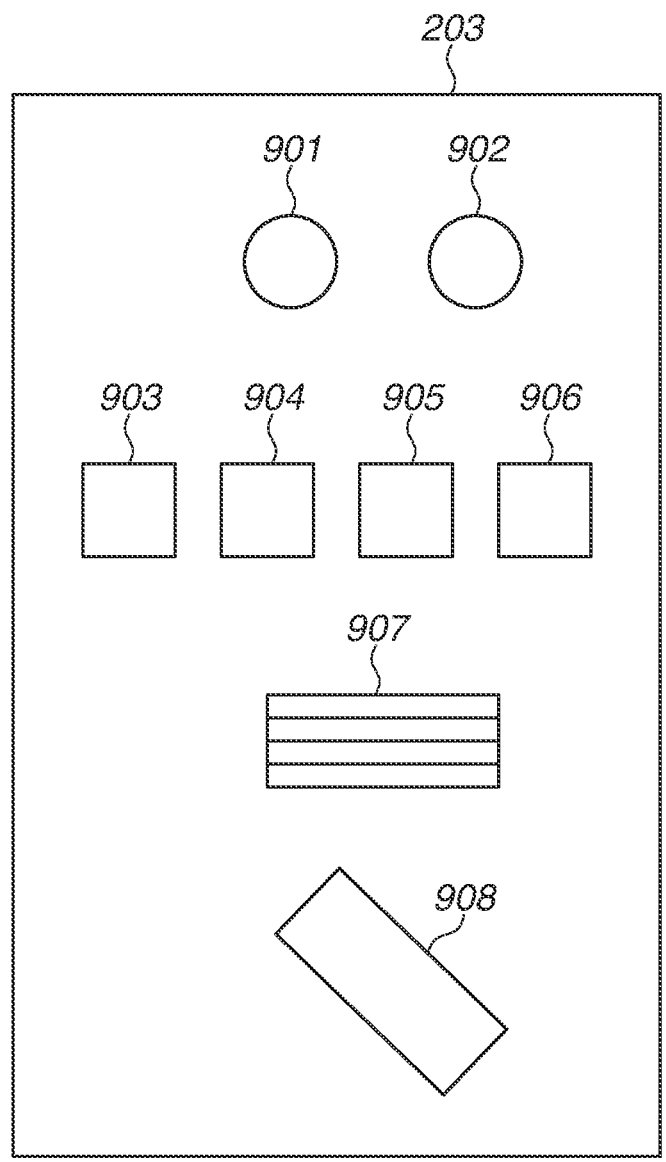
FIG. 4 is a diagram illustrating an example of a zoom controller.

FIG. 4 is a diagram illustrating an example of the controller 203 as a zoom controller. In the example of FIG. 4, the controller 203 includes two knobs (901 and 902), four buttons (903 to 906), a dial 907, and a seesaw switch 908.

Figure 5:
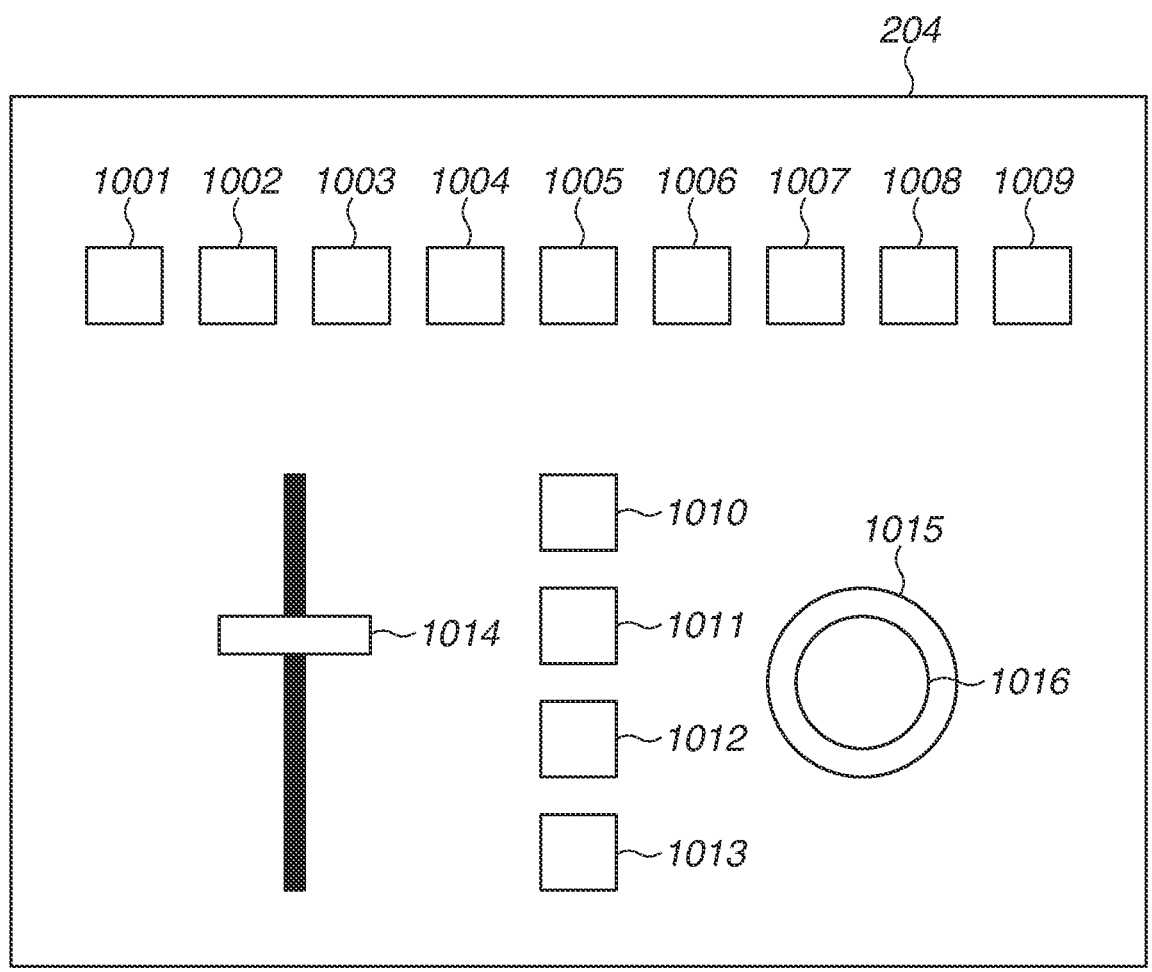
FIG. 5 is a diagram illustrating an example of a replay controller.

FIG. 5 is a diagram illustrating an example of the controller 204 as a replay controller. The controller 204 includes 13 buttons (1001 to 1013), a slider 1014, a jog wheel 1015, and a finger wheel 1016.

Figure 6:
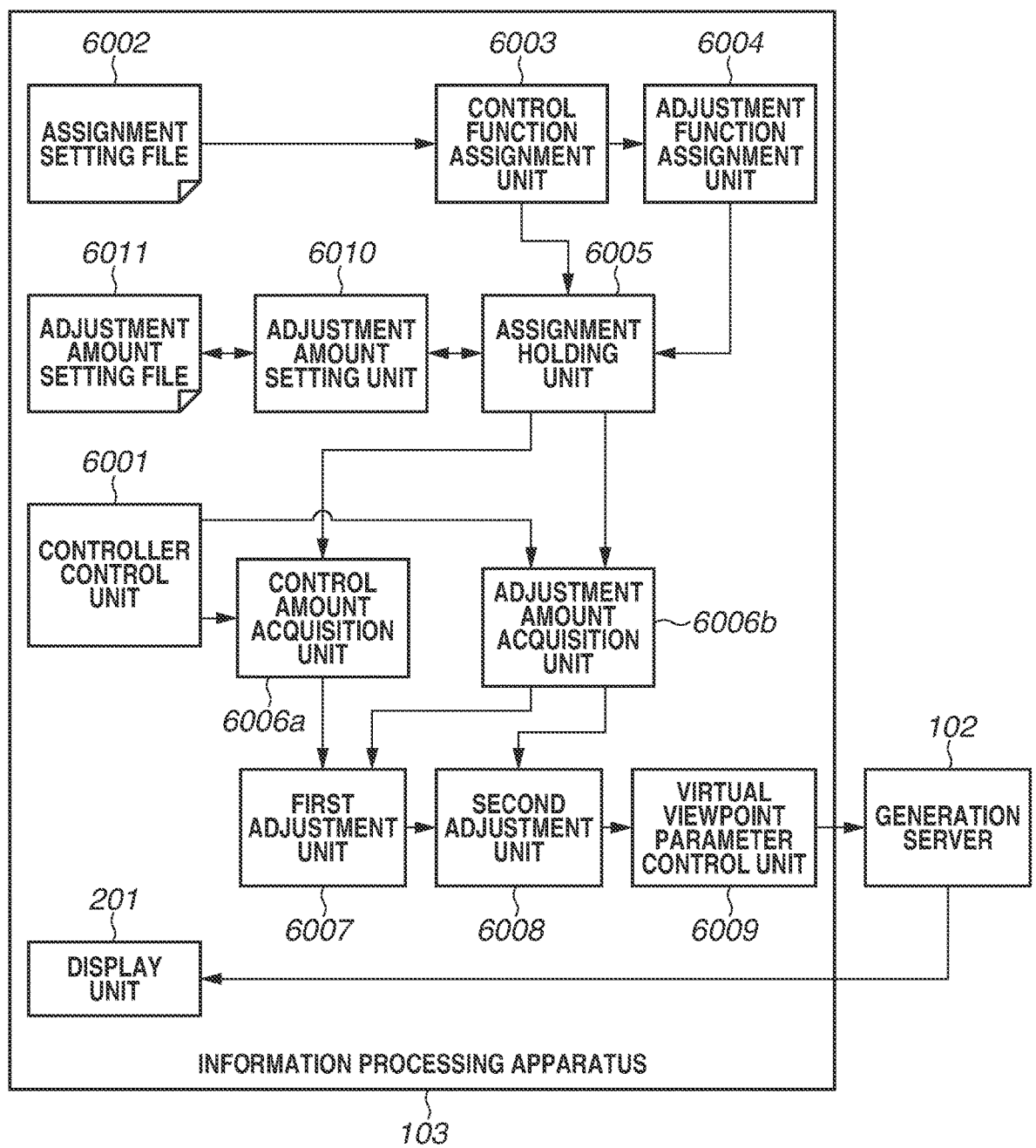
FIG. 6 is a diagram illustrating an example of a functional configuration of an information processing apparatus.

FIG. 6 is a diagram illustrating an example of the functional configuration of the information processing apparatus 103.

The information processing apparatus 103 includes a controller control unit 6001, a control function assignment unit 6003, an adjustment function assignment unit 6004, an assignment holding unit 6005, a control amount acquisition unit 6006a, an adjustment amount acquisition unit 6006b, a first adjustment unit 6007, and a second adjustment unit 6008. Further, the information processing apparatus 103 includes a virtual viewpoint parameter control unit 6009 and an adjustment amount setting unit 6010. The controller control unit 6001 receives operations through members included in a controller included in the input/output unit 115.

In the present exemplary embodiment, using a controller 7000 as a controller used to control virtual viewpoint parameters, the controller control unit 6001 receives operations through members included in the controller 7000. The information processing apparatus 103 uses, as the controller 7000, some or all of the controllers 202a, 202b, 203, and 204 described with reference to FIG. 2.

FIG. 7 illustrates examples of the controller 7000. The controller 7000 includes a first member 7001 used in the operation of giving an instruction to perform a process for controlling virtual viewpoint parameters. Further, the controller 7000 includes second members 7002 used to adjust the amounts of change in the virtual viewpoint parameters in the process for controlling the virtual viewpoint parameters executed according to the operation on the first member 7001.

According to the fact that a user operation on the first member 7001 is performed, the information processing apparatus 103 changes a virtual viewpoint parameter corresponding to the first member 7001. Hereinafter, the process of associating the first member 7001 with the type of a virtual viewpoint parameter to be controlled according to an operation on the first member 7001 will be represented as "the assignment of the control function of the virtual viewpoint parameter".

Furthermore, if assigning the first member 7001 the control function of the virtual viewpoint parameter, the information processing apparatus 103 further performs the following processing. That is, the information processing apparatus 103 determines any of the second members 7002 as a member for adjusting the amount of change in the virtual viewpoint parameter corresponding to the first member 7001.

Hereinafter, the process of thus determining any of the second members 7002 as a member to be used to specify an adjustment parameter in a control process to be executed when a certain operation through the first member 7001 is performed will be represented as "the assignment of the adjustment function of the adjustment parameter to the second member 7002". The information processing apparatus 103 acquires a value indicated by any of the second members 7002, and according to the acquired value, determines the value of an adjustment parameter corresponding to the second member 7002.

For example, suppose that three types of operations through the first member 7001 are assigned the control functions of the three parameters indicating the position of the virtual camera (the X-axis coordinate, the Y-axis coordinate, and the Z-axis coordinate). In this case, the second members 7002 are assigned the adjustment functions of adjustment parameters in a control process for changing the values of the three virtual viewpoint parameters, i.e., the X-axis coordinate, the Y-axis coordinate, and the Z-axis coordinate, of the virtual camera.

The first member 7001 is a member used in N types (N is an integer greater than or equal to 1) of operations. Further, it is desirable that the first member 7001 should be a member that, when the user separates his/her hand from the member, returns to a position (e.g., the center) determined in advance. The first member 7001 is a member such as a joystick or a seesaw switch.

The number of second members 7002 is greater than or equal to M times (M is an integer greater than or equal to 1, e.g., 1 or 2) the number N of the types of operations performed through the first member 7001. That is, the number of second members 7002 is greater than or equal to N×M. Further, it is desirable that each of the second members 7002 should be a member that, when the user separates his/her hand from the member, holds its state. Each of the second members 7002 is a member such as a knob or a slider. If M=1, N or more second members 7002 are present.

Each of the second members 7002 is assigned, for example, the adjustment function of the maximum velocity as an adjustment parameter indicating the amount of change in a virtual viewpoint parameter when a corresponding operation through the first member 7001 is performed by the maximum amount. By operating the second member 7002 assigned the adjustment function of the maximum velocity, the user can appropriately adjust the maximum velocity according to the image capturing target.

For example, through the second members 7002, the user can make an adjustment such that the wider the image capturing range, the greater the maximum velocities corresponding to the virtual viewpoint parameters indicating the position of the virtual camera, and can also make an adjustment such that the smaller the image capturing range, the smaller the maximum velocities. For example, in a case where the image capturing target is a soccer match, then through the second members 7002, the user can make an adjustment such that the maximum velocities are greater than in a case where the image capturing target is a table tennis match.

Further, if M=2, the controller 7000 includes 2N or more second members 7002. That is, two second members 7002 are present corresponding to a single operation through the first member 7001. In this case, one of the two second members 7002 corresponding to the single operation through the first member 7001 is assigned, for example, the adjustment function of the maximum velocity as an adjustment parameter. Furthermore, the other of the two second members 7002 is assigned, for example, the adjustment function of a parameter used in a curve as a technique for, according to the operation amount of a corresponding operation through the first member 7001, adjusting the amount of change in a corresponding virtual viewpoint parameter. The curve is a technique for adjusting the amount of change in a virtual viewpoint parameter according to the operation amount of an operation through the first member 7001. Hereinafter, the parameter used in the curve will be referred to as a "curve parameter". The curve parameter defines the sensitivity of change in a virtual viewpoint parameter according to an operation on the first member 7001.

Consequently, through the second members 7002, the user can appropriately adjust the curve according to camerawork. For example, in the case of camerawork that images the entirety of a target from a distance, the curve is made small, thereby enabling subtle control. Further, in the case of camerawork that images a target largely from near, the curve is made great, thereby enabling dynamic control. The user can make an adjustment such that with respect to each operation through the first member 7001, an adjustment parameter in a process for controlling a corresponding virtual viewpoint parameter differs. For example, a case is described where a virtual viewpoint image in a soccer match is generated. A soccer field is wider in the horizontal direction than in the vertical direction. Thus, through the second members 7002, the user can make the maximum velocities regarding the X-axis coordinate, the Y-axis coordinate, and the pan angle as the virtual viewpoint parameters regarding the position and the orientation in the horizontal direction greater. Further, through the second members 7002, the user can make the maximum velocities regarding the Z-axis coordinate and the tilt angle as the virtual viewpoint parameters regarding the position in the vertical direction smaller. This enables the user to more easily specify the virtual viewpoint.

FIG. 7 is a diagram illustrating examples of the controller 7000.

A controller 7000a is an example of the controller 7000 in a case where a seesaw switch used in an operation on a single axis (a single type of operation) is used as the first member 7001. Since a single type of operation is performed through the first member 7001, N=1. If M=2, the number of second members 7002 included in the controller 7000a is two (N×M=1×2=2). If M=1, the number of second members 7002 included in the controller 7000a is one (N×M=1×1=1). In the example of the controller 7000a, the second members 7002 are knobs. The information processing apparatus 103 can use as the controller 7000a a controller including a seesaw switch and two or more knobs, such as the controller 202 or the controller 203.

A controller 7000b is an example of the controller 7000 in a case where a joystick used in operations on two axes (two types of operations such as an operation in an up-down direction on the stick, and an operation in a left-right direction on the stick) is used as the first member 7001. Since two types of operations are performed through the first member 7001, N=2. If M=2, the number of second members 7002 included in the controller 7000b is four (N×M=2×2=4). If M=1, the number of second members 7002 included in the controller 7000b is two (N×M=2×1=2). In the example of the controller 7000b, the second members 7002 are knobs. The information processing apparatus 103 can use as the controller 7000*b* a controller including a joystick that enables operations on two axes and four or more knobs, such as the controller 202.

A controller 7000*c* is an example of the controller 7000 in a case where a joystick used in operations on three axes (three types of operations such as an operation in an up-down direction on the stick, an operation in a left-right direction on the stick, and a twist operation) is used as the first member 7001. Since three types of operations are performed through the first member 7001, N=3. If M=2, the number of second members 7002 included in the controller 7000*c* is six (N×M=3×2=6). If M=1, the number of second members 7002 included in the controller 7000*c* is three (N×M=3×1=3). In the example of the controller 7000*c*, the second members 7002 are knobs. The information processing apparatus 103 can use as the controller 7000*c* a controller including a joystick that enables operations on three axes and six or more knobs, such as the controller 202.

A controller 7000*d* is an example of the controller 7000 in a case where a joystick used in operations on six axes (six types of operations) is used as the first member 7001. Since six types of operations are performed through the first member 7001, N=6. If M=2, the number of second members 7002 included in the controller 7000*d* is 12 (N×M=6×2=12). If M=1, the number of second members 7002 included in the controller 7000*d* is six (N×M=6×1=6). In the example of the controller 7000*d*, the second members 7002 are knobs. The information processing apparatus 103 can use as the controller 7000*d* a controller including a joystick that enables operations on six axes and 12 knobs. Operation members used to operate the virtual viewpoint are not limited to these examples. For example, a controller may include a touch panel as an operation member.

The storage unit 116 stores an assignment setting file 6002 that indicates the control function of which virtual viewpoint parameter is to be assigned to which operation through a first member of which controller, and also indicates the adjustment function of which adjustment parameter is to be assigned to a second member. Based on a user operation through input devices such as a mouse and a keyboard included in the input/output unit 115, the CPU 111 can update the content of the assignment setting file 6002 stored in the storage unit 116. The assignment setting file 6002 is an example of specifying information indicating the specifying of a virtual viewpoint parameter of which the value is changed according to an operation through the first member 7001. The assignment setting file 6002 is a file that indicates the control function of which virtual viewpoint parameter is to be assigned to which operation through a first member of which controller, and also indicates the adjustment function of which adjustment parameter is to be assigned to a second member.

FIG. 8 is a diagram illustrating an example of the assignment setting file 6002. The assignment setting file 6002 includes, for example, commands 8001 to 8003.

The command 8001 is a command giving an instruction to add a controller to be used. In the example of FIG. 8, the command 8001 is a command giving an instruction to add two controllers 7000 (controllers 7000*c*) that enable operations on three axes through a first member 7001. The information processing apparatus 103 reads the assignment setting file 6002, acquires the command 8001, and adds the controllers 7000 indicated by the acquired command 8001 to controllers to be used. In the example of FIG. 8, the information processing apparatus 103 adds the controllers 202*a* and 202*b* as the controllers 7000 to be used.

The command 8002 is a command indicating the specifying of the control function of which virtual viewpoint parameter is to be assigned to which operation through a first member 7001 of which controller. The command 8002 is a command indicating the specifying of "assign control of the X-axis coordinate of the virtual camera to an operation in a left-right direction of a joystick (a first member 7001) of the first controller 7000". The information processing apparatus 103 reads the assignment setting file 6002, acquires the command 8002, and assigns the control functions indicated by the acquired command 8002. A virtual viewpoint parameter of which the value is changed according to an operation through the first member 7001 specified by the command 8002 is an example of a specifying parameter.

Suppose that the command 8002 includes the specifying of the assignment of the control functions of virtual viewpoint parameters regarding the generation of the same virtual viewpoint image to operations through first members 7001 of a plurality of controllers 7000. In this case, the information processing apparatus 103 can make a setting such that the plurality of controllers 7000 controls the plurality of virtual viewpoint parameters regarding the generation of the same virtual viewpoint image. For example, the information processing apparatus 103 can make a setting such that the plurality of controllers 7000 controls the same virtual camera.

The assignment setting file 6002 may include, for example, a command giving an instruction to assign a second member 7002 the adjustment function of an adjustment parameter. If the assignment setting file 6002 does not include such a command, the information processing apparatus 103 assigns the adjustment function of an adjustment parameter by a method determined in advance.

The command 8003 is a command specifying the type of a curve indicating how the amount of change in a virtual viewpoint parameter is to be adjusted using an adjustment parameter. Examples of the type of curve include an exponential curve. The exponential curve is a technique for adjusting the amount of change in (hereinafter, "the control amount of") a virtual viewpoint parameter relative to the operation amount of a first member 7001 by an exponential function. The operation amount of the first member 7001 is x, the curve parameter as an adjustment parameter determined based on the operation amount of a second member 7002 (e.g., a value indicated by the second member 7002 (a knob)) is p, and the amount of change in the virtual viewpoint parameter is f(x). For example, the information processing apparatus 103 can obtain the amount of change in the virtual viewpoint parameter using the following formula 1.

$$f(x)=x^p \quad (1)$$

Using this curve, the information processing apparatus 103 can achieve the play of the first member 7001 near the start point of x.

Further, examples of the type of curve include a Hermite curve. The Hermite curve is a technique for changing the control amount of a virtual viewpoint parameter relative to the operation amount of a first member 7001 by a cubic function. The operation amount of the first member 7001 is x, the curve parameter as an adjustment parameter determined based on the operation amount of a second member 7002 is p, and the amount of change in the virtual viewpoint parameter is f(x). For example, the information processing apparatus 103 can obtain the amount of change f(x) in the virtual viewpoint parameter by the following formula 2.

$$f(x)=(-2x^3+3x^2)(1-p)+px \quad (2)$$

Using this curve, the information processing apparatus 103 can achieve the play of the operation amount near the start point and the end point of x. To adjust the Hermite curve using a single parameter, the information processing apparatus 103 uses the following conditions. That is, the value of the start point is 0, the value of the end point is 1, and the tangents to the start point and the end point have equal values (=p).

The control function assignment unit 6003 reads the assignment setting file 6002 stored in the storage unit 116, and according to the read content, adds a controller 7000 to be used. Then, the control function assignment unit 6003 assigns a control function to an operation through a first member 7001 of the controller 7000 to be used.

Based on an operation of the user through input devices such as the mouse and the keyboard included in the input/output unit 115, the information processing apparatus 103 updates the content of the assignment setting file 6002 and thereby can switch the assignment of a control function according to the user's desire. Further, the information processing apparatus 103 can also separately assign the control functions of virtual viewpoint parameters regarding the generation of the same virtual viewpoint image to operations through first members 7001 of a plurality of controllers 7000. Furthermore, based on an instruction to assign a control function given based on an operation of the user through input devices such as the mouse and the keyboard included in the input/output unit 115, the information processing apparatus 103 may switch the assignment of a control function without using the assignment setting file 6002.

A plurality of appropriately adjusted assignment setting files 6002 is prepared, whereby, if an image capturing target, camerawork, or a user is changed, it is possible to quickly change settings.

For example, suppose that two controllers 7000 (controllers 7000c) that enable operations on three axes are used. The control function assignment unit 6003 can assign operations through a first member 7001 of one of the controllers 7000 the control functions of the virtual viewpoint parameters regarding the position (the X-axis coordinate, the Y-axis coordinate, and the Z-axis coordinate). Then, the control function assignment unit 6003 can assign operations through a first member 7001 of the other of the controllers 7000 the control functions of the virtual viewpoint parameters regarding the orientation (the pan angle, the tilt angle, and the roll angle). Alternatively, the control function assignment unit 6003 may assign operations through a first member 7001 of one of the controllers 7000 the control functions of the virtual viewpoint parameters regarding operations on the virtual camera in the horizontal direction (the X-axis coordinate, the Y-axis coordinate, and the pan angle). Yet alternatively, the control function assignment unit 6003 may assign operations through a first member 7001 of the other of the controllers 7000 the control functions of the virtual viewpoint parameters regarding operations on the virtual camera in the vertical direction and the orientation (the Z-axis coordinate, the tilt angle, and the roll angle). The user may operate the two controllers 7000 using both hands. Alternatively, two users may operate the two controllers 7000. Alternatively, assignment may be made such that in a case where the virtual viewpoint is controlled using a single controller 7000, a target to be changed according to an operation on a first member 7001 is switched from the position of the virtual viewpoint to the orientation or the angle of view of the virtual viewpoint.

The adjustment function assignment unit 6004 assigns second members 7002 the adjustment functions of adjustment parameters to be used to, in a process for controlling virtual viewpoint parameters executed according to an operation on a first member 7001, adjust the amounts of change in the virtual viewpoint parameters. For example, the adjustment function assignment unit 6004 assigns two second members 7002 the adjustment functions of two adjustment parameters, i.e., the maximum velocity and the curve parameter, in a control process according to a certain operation through the first member 7001.

For example, suppose that a plurality of second members 7002 is arranged in the horizontal direction in the controller 7000. Then, for example, the adjustment function assignment unit 6004 assigns the plurality of arranged second members 7002 adjustment functions in order starting from the left. Then, the order of the assignment of the adjustment functions of adjustment parameters, i.e., which virtual viewpoint parameter is to be selected first so that the adjustment function of an adjustment parameter is to be assigned in a process for controlling the virtual viewpoint parameter, is determined in advance. For example, the order is determined in advance as "the X-axis coordinate, the Y-axis coordinate, the Z-axis coordinate, the pan angle, the tilt angle, and the roll angle". In this case, first, the adjustment function assignment unit 6004 assigns two of the second members 7002 at the left end the adjustment functions of adjustment parameters in a process for controlling the X-axis coordinate. Then, the adjustment function assignment unit 6004 assigns the third and fourth second members 7002 from the left the adjustment functions of adjustment parameters in a process for controlling the Y-axis coordinate. The adjustment function assignment unit 6004 repeats the above processing, thereby assigning the second members 7002 the adjustment functions in the order determined in advance.

Further, for example, based on the command 8003, the adjustment function assignment unit 6004 determines which technique is to be used as the curve technique.

FIG. 9 is a table illustrating the results of the assignment of control functions and the assignment of adjustment functions to controllers 7000 that enable operations on three axes, which are made according to the assignment setting file 6002 in FIG. 8.

The assignment setting file 6002 in FIG. 8 does not include an instruction to assign an adjustment function. Thus, in the order determined in advance, the adjustment function assignment unit 6004 assigns a plurality of horizontally arranged second members 7002 the adjustment functions of adjustment parameters, starting from the left.

In the example of FIG. 9, in the first controller 7000, operations through a first member 7001 are assigned the control functions of virtual viewpoint parameters indicating the X-axis coordinate, the Y-axis coordinate, and the Z-axis coordinate. Thus, for example, the adjustment function assignment unit 6004 assigns second members 7002 the adjustment functions of adjustment parameters in a process for controlling the virtual viewpoint parameters indicating the X-axis coordinate, the Y-axis coordinate, and the Z-axis coordinate, in order starting from the left.

Further, in the example of FIG. 9, in the second controller 7000, operations through a first member 7001 are assigned the control functions of virtual viewpoint parameters indicating the pan angle, the tilt angle, and the roll angle. Thus, for example, the adjustment function assignment unit 6004 assigns second members 7002 the adjustment functions of adjustment parameters in a process for controlling the virtual viewpoint parameters indicating the pan angle, the tilt angle, and the roll angle, in order starting from the left.

In the present exemplary embodiment, second members 7002 are assigned adjustment functions in the order determined in advance according to corresponding virtual viewpoint parameters. Thus, the assignment of the adjustment functions to the second members 7002 does not depend on the order of the assignment of control functions to operations through a first member 7001. For example, even if the order of the assignment of the roll angle and the pan angle to the first member 7001 is reversed, the assignment of the adjustment functions to the second members 7002 does not change. This enables the user to easily grasp the order of the adjustment functions assigned to the second members 7002.

The assignment holding unit 6005 stores the results of the assignment made by the control function assignment unit 6003 and the adjustment function assignment unit 6004 in the RAM 112, for example, thereby holding the results.

The control amount acquisition unit 6006*a* acquires a value obtained by normalizing the operation amount of a first member 7001 with respect to each operation through the first member 7001, as a control amount indicating the amount of change in a virtual viewpoint parameter. The control amount acquisition unit 6006*a* references the results of the assignment held in the assignment holding unit 6005 and grasps which operation through the first member 7001 corresponds to control of which virtual viewpoint parameter. Then, through the controller control unit 6001, the control amount acquisition unit 6006*a* acquires the control amounts regarding operations through the first member 7001.

For example, to control a virtual viewpoint parameter, the user operates the first member 7001 as a joystick. As a result, based on the operation amounts of the first member 7001, the control amount acquisition unit 6006*a* acquires control amounts regarding operations on the first member 7001 (an operation in the left-right direction on the joystick, an operation in the up-down direction on the joystick, and a twist operation). This is described more specifically below.

The control amount acquisition unit 6006*a* normalizes each control amount such that the range of the values of the control amount is −1 to 1. For example, the control amount acquisition unit 6006*a* acquires the operation amount of the first member 7001 as a signal with an accuracy of 8 bits through the controller control unit 6001. The range of the values of the operation amount to be acquired is 0 to 255. The control amount acquisition unit 6006*a* corrects the range of the values by subtracting 128 from the values in the range so that the center of the range is 0, whereby the range of the values of the operation amount to be acquired is −128 to 127. Further, the control amount acquisition unit 6006*a* divides the values in the range by 128 such that the maximum value of the range is 1, whereby the range of the values of the operation amount to be acquired is −1 to 1. The control amount acquisition unit 6006*a* acquires this normalized value as the control amount. That is, the control amount acquisition unit 6006*a* detects an operation on the first member 7001, acquires the operation amount with an accuracy of 8 bits, subtracts 128 from the acquired operation amount, and divides the resulting value by 128, thereby acquiring the control amount that is the normalized operation amount.

As described above, the control amount acquisition unit 6006*a* normalizes the operation amount of the first member 7001 to a range determined in advance and acquires the normalized operation amount as the control amount.

The adjustment amount acquisition unit 6006*b* acquires values obtained by normalizing the operation amounts of second members 7002, as adjustment amounts indicating adjustment parameters. The adjustment amount acquisition unit 6006*b* references the results of the assignment held in the assignment holding unit 6005 and acquires values corresponding to adjustment functions from the second members 7002. The adjustment amount acquisition unit 6006*b* references the results of the assignment held in the assignment holding unit 6005 and grasps to which adjustment parameter each of the second members 7002 corresponds. Then, the adjustment amount acquisition unit 6006*b* acquires the adjustment amounts regarding operations through the second members 7002.

For example, to adjust the maximum velocity as an adjustment parameter regarding a virtual viewpoint parameter, the user turns a knob (a second member 7002) corresponding to the maximum velocity. The adjustment amount acquisition unit 6006*b* detects an operation through the second member 7002 and acquires the operation amount of the second member 7002 (a value indicated by the second member 7002) as an adjustment amount as a parameter to be used to adjust the amount of change in the virtual viewpoint parameter. This is described more specifically below.

First, the adjustment amount regarding the maximum velocity is described. Suppose that the maximum velocity is normalized, for example, so that the range of the values of the maximum velocity is 0 to 200. For example, the adjustment amount acquisition unit 6006*b* acquires the operation amount of a second member 7002 assigned the adjustment function of the maximum velocity, as a signal with an accuracy of 8 bits through the controller control unit 6001. The range of the values of the operation amount to be acquired is 0 to 255. For example, the adjustment amount acquisition unit 6006*b* divides the acquired operation amount by 255 and multiplies the resulting value by 200, thereby normalizing the range of the values of the operation amount to 0 to 200. The adjustment amount acquisition unit 6006*b* acquires this normalized value as the adjustment amount regarding the maximum velocity.

Next, the adjustment function of the curve parameter is described. In a case where the exponential curve is used, the curve parameter is normalized, for example, so that the range of the values of the curve parameter is 1 to 5. For example, the adjustment amount acquisition unit 6006*b* acquires the operation amount of a second member 7002 assigned the adjustment function of the curve parameter regarding the exponential curve, as a signal with an accuracy of 8 bits. The range of the values of the operation amount to be acquired is 0 to 255. The adjustment amount acquisition unit 6006*b* divides the acquired operation amount by 255, multiplies the resulting value by 4, and adds 1 to the resulting value, thereby normalizing the operation amount. The adjustment amount acquisition unit 6006*b* acquires this normalized operation amount as the adjustment amount.

In a case where the Hermite curve is used, the curve parameter is normalized, for example, so that the range of the values of the curve parameter is 0 to 1. For example, the adjustment amount acquisition unit 6006*b* acquires the operation amount of a second member 7002 assigned the adjustment function of the curve parameter regarding the Hermite curve, as a signal with an accuracy of 8 bits. The range of the values of the operation amount to be acquired is 0 to 255. The adjustment amount acquisition unit 6006*b* divides the acquired operation amount by 255, thereby normalizing the operation amount. The adjustment amount acquisition unit 6006*b* acquires this normalized operation amount as the adjustment amount.

Using the adjustment amount acquired by the adjustment amount acquisition unit 6006b (the curve parameter as an adjustment parameter), the first adjustment unit 6007 adjusts the control amount acquired by the control amount acquisition unit 6006a. A description is given below of a case where the exponential curve is used. For example, suppose that the control amount of an operation through a first member 7001 assigned the control function of the X-axis coordinate by the control amount acquisition unit 6006a is 0.5. Further, the adjustment amount of the curve parameter acquired by the adjustment amount acquisition unit 6006b is 2. In this case, the first adjustment unit 6007 performs exponentiation with the control amount regarding the X-axis as a base and the adjustment amount of the curve parameter as an exponent, thereby acquiring $0.5^2=0.25$ as the adjusted control amount.

Using the adjustment amount acquired by the adjustment amount acquisition unit 6006b (the maximum velocity as an adjustment parameter), the second adjustment unit 6008 further adjusts the control amount adjusted by the first adjustment unit 6007. For example, suppose that the control amount regarding the X-axis coordinate adjusted by the first adjustment unit 6007 is 0.25. Further, the adjustment amount of the maximum velocity acquired by the adjustment amount acquisition unit 6006b is 100. The second adjustment unit 6008 multiplies the control amount adjusted by the first adjustment unit 6007 by the adjustment amount of the maximum velocity acquired by the adjustment amount acquisition unit 6006b, thereby acquiring 0.25×100=25 as the adjusted control amount. For example, in units of meters/second, the speed of change in the X-axis coordinate is 25 meters/second.

Using the control amount adjusted by the first adjustment unit 6007 and the second adjustment unit 6008, the virtual viewpoint parameter control unit 6009 controls a corresponding virtual viewpoint parameter. For example, suppose that the control amount regarding the X-axis coordinate is 25 meters/second. Further, an image is generated at 60 frames/second. In this case, the virtual viewpoint parameter control unit 6009 instructs the generation server 102 to change the position of the virtual camera by 25/60≈0.4 meters per frame on the X-axis, thereby generating a virtual viewpoint image. The virtual viewpoint parameter control unit 6009 also performs similar processing on other virtual viewpoint parameters and controls virtual viewpoint parameters in frame units.

The adjustment amount setting unit 6010 stores data of the adjustment amounts of adjustment parameters indicated by second members 7002, as an adjustment amount setting file 6011 in the storage unit 116. Further, the information processing apparatus 103 can read the adjustment amount setting file 6011 and set the adjustment amounts regarding adjustment parameters for the second members 7002. Consequently, the information processing apparatus 103 can more easily save and set an adjustment amount that differs with respect to each image capturing target, each type of camerawork, or each user. The image capturing target is, for example, the type of event (a soccer match, a table tennis match, a concert, or a ceremony). However, instead of or in addition to the type of event, the type of scene (a penalty kick, a corner kick, a kickoff, or a goal) may be represented as the image capturing target. For example, the information processing apparatus 103 according to the present exemplary embodiment can acquire a necessary adjustment amount setting file from among a plurality of adjustment amount setting files prepared for respective image capturing targets and control virtual viewpoint parameters. In this manner, if an image capturing target is changed, it is possible to quickly change settings. Further, for example, the information processing apparatus 103 according to the present exemplary embodiment can acquire an adjustment amount setting file according to identification information regarding a user from among a plurality of adjustment amount setting files prepared for respective users and control virtual viewpoint parameters. In this manner, if a user is changed, it is possible to quickly change settings.

That is, a plurality of appropriately adjusted adjustment amount setting files 6011 is prepared, whereby, if an image capturing target, camerawork, or a user is changed, it is possible to quickly change settings.

FIG. 10 is a flowchart illustrating an example of processing in which the information processing apparatus 103 assigns a control function and assigns an adjustment function. For example, the information processing apparatus 103 executes the processing in FIG. 10 when the information processing apparatus 103 starts. Alternatively, the information processing apparatus 103 may execute the processing in FIG. 10 when an image capturing target, camerawork, or a user is switched.

In step S10001, the control function assignment unit 6003 reads the assignment setting file 6002 from the storage unit 116.

In step S10002, the control function assignment unit 6003 acquires commands that have not yet been processed one by one in order from the assignment setting file 6002 read in step S10001. If the control function assignment unit 6003 acquires a command that has not yet been processed (YES in step S10002), the processing proceeds to step S10003. If the control function assignment unit 6003 does not acquire a command that has not yet been processed, i.e., all the commands have been processed (NO in step S10002), the processing proceeds to step S10008.

In step S10003, the control function assignment unit 6003 determines the type of the command that has not yet been processed and is acquired in step S10002. If the command is a command giving an instruction to add a controller (e.g., the command 8001) (YES in step S10003), the processing proceeds to step S10004. If the command is another command (NO in step S10003), the processing proceeds to step S10005.

In step S10004, according to the command acquired based on the determination in step S10002, the control function assignment unit 6003 adds a controller to be used by the user, as a controller 7000 to be used to control virtual viewpoint parameters. Then, the controller control unit 6001 detects operations through members of the controller 7000 specified by this command and acquires the operation amounts of the operations.

In step S10005, the control function assignment unit 6003 determines whether the command acquired in step S10002 is a command giving an instruction to assign a control function (e.g., the command 8002). If it is determined that the command acquired in step S10002 is a command giving an instruction to assign a control function (YES in step S10005), the processing proceeds to step S10006. Further, if it is determined that the command acquired in step S10002 is another command (NO in step S10005), the control function assignment unit 6003 determines that the command acquired in step S10002 is a command specifying the type of curve (e.g., the command 8003). Then, the processing proceeds to step S10007.

In step S10006, according to the command acquired based on the determination in step S10002, the control function assignment unit 6003 assigns the control function of a virtual viewpoint parameter specified by the command to an operation specified by the command through a first member 7001. Further, if the command acquired based on the determination in step S10002 includes an instruction to assign a second member 7002 the adjustment function of an adjustment parameter, the adjustment function assignment unit 6004 may perform the following processing according to the instruction. That is, the adjustment function assignment unit 6004 may assign the adjustment function of the adjustment parameter specified by the command to the second member 7002 specified by the command.

In step S10007, according to the command (e.g., the command 8003) acquired based on the determination in step S10002 and indicating the specifying of the type of curve, the adjustment function assignment unit 6004 performs the following processing. That is, the adjustment function assignment unit 6004 determines each of the types of curves to be used to adjust virtual viewpoint parameters, as the curve specified by the command.

In step S10008, the adjustment function assignment unit 6004 determines whether the assignment of the adjustment functions of adjustment parameters to second members 7002 of each of controllers 7000 to be used is completed. If it is determined that the assignment is completed (YES in step S10008), the processing in FIG. 10 ends. If it is determined that the assignment is not completed (NO in step S10008), the processing proceeds to step S10009.

In step S10009, the adjustment function assignment unit 6004 performs the following processing with respect to each of the controllers 7000 to be used. That is, in the order determined in advance, the adjustment function assignment unit 6004 assigns the second members 7002 the adjustment functions of adjustment parameters regarding virtual viewpoint parameters of which the control functions are assigned to operations on a first member 7001.

FIG. 11 is a flowchart illustrating an example of the process of controlling a virtual viewpoint parameter executed according to an operation of the user on a controller. In the example of FIG. 11, a description is given of processing in a case where a process for controlling the X-axis coordinate is performed according to an operation through a first member 7001 of a controller 7000. Further, the exponential curve is used to adjust the amount of change in a virtual viewpoint parameter.

In step S11001, the control amount acquisition unit 6006*a* detects an operation on the first member 7001 assigned the control function of the X-axis coordinate and acquires the operation amount of the detected operation. For example, the control amount acquisition unit 6006*a* references the results of the assignment held in the assignment holding unit 6005, identifies an operation on the first member 7001 assigned the control function of the X-axis coordinate, and detects the identified operation. Then, the control amount acquisition unit 6006*a* acquires the operation amount of the detected operation and normalizes the acquired operation amount, thereby acquiring the control amount.

In step S11002, the first adjustment unit 6007 determines whether the exponential curve is to be used to adjust the control amount. For example, suppose that the storage unit 116 stores information indicating whether the exponential curve is to be used to adjust the control amount. In this case, based on the information stored in the storage unit 116, the first adjustment unit 6007 determines whether the exponential curve is to be used to adjust the control amount.

Alternatively, based on whether a second member 7002 is assigned the adjustment function of the curve parameter to be used in the exponential curve, the first adjustment unit 6007 may determine whether the exponential curve is to be used to adjust the control amount. For example, if a second member 7002 is assigned the adjustment function of the curve parameter to be used in the exponential curve, the first adjustment unit 6007 determines that the exponential curve is to be used to adjust the control amount. Further, for example, if a second member 7002 is not assigned the adjustment function of the curve parameter to be used in the exponential curve, the first adjustment unit 6007 determines that the exponential curve is not to be used to adjust the control amount.

If it is determined that the exponential curve is to be used to adjust the control amount (YES in step S11002), the processing proceeds to step S11003. If it is determined that the exponential curve is not to be used (NO in step S11002), the processing proceeds to step S11005.

In step S11003, the adjustment amount acquisition unit 6006*b* acquires the operation amount of a second member 7002 assigned the adjustment function of the curve parameter as an adjustment parameter in the process for controlling the X-axis coordinate. For example, the adjustment amount acquisition unit 6006*b* references the results of the assignment held in the assignment holding unit 6005 and identifies a second member 7002 assigned the adjustment function of the curve parameter as an adjustment parameter in the process for controlling the X-axis coordinate. Then, the adjustment amount acquisition unit 6006*b* acquires the operation amount of the identified second member 7002 and normalizes the acquired operation amount, thereby acquiring the curve parameter.

In step S11004, based on the control amount acquired in step S11001 and the curve parameter acquired in step S11003, the first adjustment unit 6007 adjusts the control amount regarding the X-axis coordinate using the exponential curve. For example, the first adjustment unit 6007 adjusts the control amount regarding the X-axis coordinate using formula 1, where the control amount acquired in step S11001 is x, and the curve parameter acquired in step S11003 is p.

In step S11005, the adjustment amount acquisition unit 6006*b* acquires the operation amount of a second member 7002 assigned the adjustment function of the maximum velocity as an adjustment parameter in the process for controlling the X-axis coordinate. For example, the adjustment amount acquisition unit 6006*b* references the results of the assignment held in the assignment holding unit 6005 and identifies a second member 7002 assigned the adjustment function of the maximum velocity as an adjustment parameter in the process for controlling the X-axis coordinate. Then, the adjustment amount acquisition unit 6006*b* acquires the operation amount of the identified second member 7002 and normalizes the acquired operation amount, thereby acquiring the maximum velocity.

In step S11006, based on the control amount adjusted in step S11004 and the maximum velocity acquired in step S11005, the second adjustment unit 6008 adjusts the control amount regarding the X-axis coordinate. For example, the second adjustment unit 6008 multiplies the control amount adjusted in step S11004 by the maximum velocity acquired in step S11005, thereby adjusting the control amount regarding the X-axis coordinate.

In step S11007, based on the control amount adjusted in step S11006, the virtual viewpoint parameter control unit 6009 performs control to change the value of the X-axis coordinate as a virtual viewpoint parameter.

The information processing apparatus 103 can also perform control to change the values of other virtual viewpoint parameters by processing similar to that in FIG. 11.

In the present exemplary embodiment, the information processing apparatus 103 assigns the control function of a specified virtual viewpoint parameter to each operation through a first member 7001 of a controller 7000. That is, the information processing apparatus 103 determines that a control process that is the process of performing control to change the value of a specified virtual viewpoint parameter is to be executed according to the fact that an operation through the first member 7001 is performed.

Further, the information processing apparatus 103 determines a second member 7002 of the controller 7000 as a member to be used to specify the value of an adjustment parameter to be used in a process that, based on a determination, is to be executed according to the fact that an operation through the first member 7001 is performed.

Consequently, the information processing apparatus 103 can enable control of a virtual viewpoint parameter according to specifying by an operation through the controller 7000. Thus, the user can control a virtual viewpoint parameter according to specifying through the controller 7000. That is, the information processing apparatus 103 can improve the convenience of control of a virtual viewpoint parameter. The content of the present exemplary embodiment can also be described as follows. That is, the information processing apparatus 103 performs a process for associating a plurality of types of parameters (virtual viewpoint parameters) regarding the generation of a virtual viewpoint image based on a plurality of captured images obtained by a plurality of cameras capturing images from different directions, with one or more operation members (members 7001). Then, according to the results of the association process, the information processing apparatus 103 controls a parameter corresponding to an operation member operated by the user among the one or more operation members. To control a virtual viewpoint parameter, the information processing apparatus 103 can output a control signal to the generation server 102. However, there can also be a case where the information processing apparatus 103 and the generation server 102 are integrated together. In a case where the information processing apparatus 103 and the generation server 102 are integrated together, then according to an operation of the user on an operation member, the information processing apparatus 103 controls the virtual viewpoint parameter set in an image generation unit included in the information processing apparatus 103 itself.

Further, the information processing apparatus 103 can generate specifying information (the assignment setting file 6002) indicating the correspondence relationships between a plurality of types of parameters (virtual viewpoint parameters) and members 7001. Consequently, the information processing apparatus 103 references the specifying information and thereby can identify a virtual viewpoint parameter as a control target. Further, the specifying information may include not only the correspondence relationships between the virtual viewpoint parameters and the members 7001, but also information regarding the correspondence relationships between the virtual viewpoint parameters and adjustment members (members 7002) for determining the adjustment amounts of the parameters. In this manner, the information processing apparatus 103 references the specifying information and thereby can determine the adjustment amount of a virtual viewpoint parameter according to an operation of the user on each member 7001.

Further, specifying information to be applied may be selected from among a plurality of pieces of specifying information different from each other in assigned operation members. Further, the above specifying information may be generated with respect to each user. Specifically, the information processing apparatus 103 generates specifying information including identification information regarding a user. Then, the information processing apparatus 103 selects specifying information corresponding to an operator of a member 7001 from among the plurality of pieces of specifying information and controls a virtual viewpoint parameter based on the selected specifying information. In this manner, it is possible to more quickly switch settings with respect to each user.

Further, the above specifying information may be generated with respect to each image capturing target. Specifically, the information processing apparatus 103 generates specifying information including information regarding an image capturing target. Then, the information processing apparatus 103 identifies an image capturing target, also selects specifying information according to the image capturing target from among the plurality of pieces of specifying information, and controls a virtual viewpoint parameter based on the selected specifying information. In this manner, it is possible to more quickly switch settings with respect to each image capturing target. Possible examples of the information regarding the image capturing target include information for identifying the type of event, and information for identifying the type of scene.

According to the above exemplary embodiments, it is possible to improve the convenience of control of a parameter regarding the generation of a virtual viewpoint image.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Reconsideration of this application and entry of this amendment is respectfully requested. By the amendments, Applicants do not acquiesce to the propriety of any of the Examiner's rejections and do not disclaim any subject matter to which Applicants are entitled. *Cf Warner Jenkinson Co. v. Hilton-Davis Chem. Co.,* 41 U.S.P.Q.2d 1865 (U.S. 1997).

This application claims the benefit of Japanese Patent Application No. 2018-136900, filed Jul. 20, 2018, which is hereby incorporated by reference herein in its entirety.

What is claimed is:

1. An information processing apparatus comprising:
one or more hardware processors; and
one or more memories which store instructions executable by the one or more hardware processors to cause the information processing apparatus to perform at least:
based on a first parameter which is set according to an operation on a first operation unit, and also based on an operation on a second operation unit, changing at least either of a position of a virtual viewpoint corresponding to a virtual viewpoint image and a direction of view from the virtual viewpoint;
receiving a switching input for switching a parameter, which is set according to an operation on the first operation unit, from the first parameter to a second parameter,
wherein the first parameter is a parameter defining a maximum velocity of a change in the virtual viewpoint according to an operation on the second operation unit, and
wherein the second parameter is a parameter defining sensitivity of a change in the virtual viewpoint according to an operation on the second operation unit; and
based on the second parameter which is set according to an operation on the first operation unit performed after the switching input is received, and also based on an operation on the second operation unit, changing at least either of the position of the virtual viewpoint and the direction of view from the virtual viewpoint.

2. The information processing apparatus according to claim 1, wherein based on the first parameter which is set according to an operation on the first operation unit performed before the switching input is received, and also based on an operation on the second operation unit, the position of the virtual viewpoint is changed, and
wherein based on the second parameter which is set according to an operation on the first operation unit performed after the switching input is received, and also based on the operation on the second operation unit, the position of the virtual viewpoint is changed.

3. The information processing apparatus according to claim 1,
wherein the parameter defining sensitivity of a change in the virtual viewpoint includes at least one of (a)a parameter defining, according to an exponential curve, sensitivity of a change in the virtual viewpoint according to an operation on the second operation unit and (b)a parameter defining, according to a Hermite curve, sensitivity of a change in the virtual viewpoint according to an operation on the second operation unit.

4. The information processing apparatus according to claim 1, wherein the position of the virtual viewpoint or the direction of view from the virtual viewpoint is changed based on the first parameter, the second parameter, and an operation on the second operation unit.

5. The information processing apparatus according to claim 1, wherein the instructions further cause the information processing apparatus to perform:
receiving an input for switching a target to be changed according to an operation on the second operation unit, from the position of the virtual viewpoint to the direction of view from the virtual viewpoint.

6. The information processing apparatus according to claim 1, wherein the instructions further cause the information processing apparatus to perform:
receiving an input for switching a target to be changed according to an operation on the second operation unit, to an angle of view of the virtual viewpoint.

7. The information processing apparatus according to claim 1, wherein the received switching input is an input according to a user operation.

8. The information processing apparatus according to claim 1, wherein the received switching input is an input of correspondence information indicating a parameter corresponding to the first operation unit.

9. The information processing apparatus according to claim 1, wherein the received switching input is an input indicating a single piece of correspondence information selected from among a plurality of pieces of correspondence information associating parameters different from each other with the first operation unit.

10. The information processing apparatus according to claim 9, wherein the single piece of correspondence information is selected based on at least either of information regarding a user and information regarding an image capturing target of the virtual viewpoint image.

11. The information processing apparatus according to claim 1, wherein the instructions further cause the information processing apparatus to perform:
after the switching input is received, generating correspondence information indicating that a parameter corresponding to the first operation unit is the second parameter.

12. The information processing apparatus according to claim 1, wherein the instructions further cause the information processing apparatus to perform:
generating the virtual viewpoint image according to at least either of the position of the virtual viewpoint and the direction of view from the virtual viewpoint changed based on the operations on the first operation unit and the second operation unit.

13. The information processing apparatus according to claim 1, wherein the instructions further cause the information processing apparatus to perform:
outputting information indicating at least either of the position of the virtual viewpoint and the direction of view from the virtual viewpoint changed based on the operations on the first operation unit and the second operation unit, to an image generation apparatus that generates the virtual viewpoint image.

14. The information processing apparatus according to claim 1, wherein the first operation unit is a knob, and the second operation unit is a joystick.

15. An information processing method comprising:
based on a first parameter which is set according to an operation on a first operation unit, and also based on an operation on a second operation unit, changing at least either of a position of a virtual viewpoint corresponding to a virtual viewpoint image and a direction of view from the virtual viewpoint;
receiving a switching input for switching a parameter, which is set according to an operation on the first operation unit from the first parameter to a second parameter, wherein the first parameter is a parameter defining a maximum velocity of a change in the virtual viewpoint according to an operation on the second operation unit, and wherein the second parameter is a parameter defining sensitivity of a change in the virtual viewpoint according to an operation on the second operation unit; and based on the second parameter which is set according to an operation on the first operation unit performed after the switching input is received, and also based on an operation on the second operation unit, changing at least either of the position of the virtual view point and the direction view from of the virtual viewpoint.

16. The information processing method according to claim 15, wherein based on the first parameter which is set according to an operation on the first operation unit performed before the switching input is received, and also based on an operation on the second operation unit, the position of the virtual viewpoint is changed, and wherein based on the second parameter which is set according to an operation on the first operation unit performed after the switching input is received, and also based on the operation on the second operation unit, the position of the virtual viewpoint is changed.

17. A non-transitory computer-readable storage medium that stores a program for causing a computer to execute an information processing method comprising:

based on a first parameter which is set according to an operation on a first operation unit, and also based on an operation on a second operation unit, changing at least either of a position of a virtual viewpoint corresponding to a virtual viewpoint image and a direction of view from the virtual viewpoint;

receiving a switching input for switching a parameter, which is set according to an operation on the first operation unit from the first parameter to a second parameter, wherein the first parameter is a parameter defining a maximum velocity of a change in the virtual viewpoint according to an operation on the second operation unit, and wherein the second parameter is a parameter defining sensitivity of a change in the virtual viewpoint according to an operation on the second operation unit; and based on the second parameter which is set according to an operation on the first operation unit performed after the switching input is received, and also based on an operation on the second operation unit, changing at least either of the position of the virtual view point and the direction view from of the virtual viewpoint.

\* \* \* \* \*